(12) United States Patent
Libman

(10) Patent No.: US 12,026,465 B2
(45) Date of Patent: Jul. 2, 2024

(54) METHOD AND SYSTEM FOR CLASSIFYING WORD AS OBSCENE WORD

(71) Applicant: YANDEX EUROPE AG, Lucerne (CH)

(72) Inventor: Mikhail Borisovich Libman, Moscow (RU)

(73) Assignee: Direct Cursus Technology L.L.C, Dubai (AE)

( * ) Notice: Subject to any disclaimer, the term of this patent is extended or adjusted under 35 U.S.C. 154(b) by 381 days.

(21) Appl. No.: 17/553,800

(22) Filed: Dec. 17, 2021

(65) Prior Publication Data

US 2022/0198143 A1    Jun. 23, 2022

(30) Foreign Application Priority Data

Dec. 22, 2020 (RU) .......................... RU2020142418

(51) Int. Cl.
- *G06F 40/232* (2020.01)
- *G06F 40/279* (2020.01)
- *G06F 40/40* (2020.01)
- *G06V 30/19* (2022.01)

(52) U.S. Cl.
CPC .......... *G06F 40/279* (2020.01); *G06F 40/232* (2020.01); *G06F 40/40* (2020.01); *G06V 30/19147* (2022.01)

(58) Field of Classification Search
CPC ........ G06F 40/232; G06F 40/10; G06F 40/16; G06F 40/183; G06F 40/186; G06F 40/20; G06F 40/205; G06F 40/242; G06F 40/247; G06F 40/268; G06F 40/30; G06F 40/40

USPC ................................. 704/9, 1, 2, 4, 10, 257
See application file for complete search history.

(56) References Cited

U.S. PATENT DOCUMENTS

| 8,296,120 B2 | 10/2012 | Phillips et al. |
| 9,703,872 B2 | 7/2017 | Spears |
| 2004/0107089 A1* | 6/2004 | Gross .................. G06Q 10/107 704/10 |

(Continued)

FOREIGN PATENT DOCUMENTS

RU       2015138140 A      3/2017

OTHER PUBLICATIONS

Russian Search Report issued on May 17, 2022 in respect of the counterpart Russian Patent Application No. 2020142418.

*Primary Examiner* — Qi Han
(74) *Attorney, Agent, or Firm* — BCF LLP

(57) ABSTRACT

There is disclosed a method and system for classifying a word as an obscene word, the method comprising, at a training phrase: acquiring a first word, the first word corresponding to a given obscene word; generating a first set of misspelled words, the first set of misspelled words comprising a plurality of misspelled variations of the first word; generating a training pairs, the training pairs comprising: a set of positive training pairs comprising the first word paired with each misspelled variations of the first word; training a machine learning algorithm, the training comprising: determining, for each training pairs, a set of features representative of a property of the training pairs; generating an inferred function based on the set of features, the inferred function being configured to assign, in use, an indecency score, the decency score being indicative of a likelihood of the word being obscene.

20 Claims, 6 Drawing Sheets

(56) References Cited

U.S. PATENT DOCUMENTS

| | | | |
|---|---|---|---|
| 2009/0228557 A1* | 9/2009 | Ganz | H04L 51/212 709/206 |
| 2013/0060560 A1* | 3/2013 | Mahkovec | G06F 40/232 704/9 |
| 2016/0154861 A1* | 6/2016 | Hegerty | G06F 40/284 707/728 |
| 2017/0147682 A1 | 5/2017 | Alaqeeli et al. | |
| 2018/0365221 A1 | 12/2018 | Mackie | |
| 2019/0213498 A1 | 7/2019 | Adjaoute | |
| 2020/0142999 A1 | 5/2020 | Pedersen | |
| 2020/0143289 A1 | 5/2020 | Kyaw et al. | |

\* cited by examiner $$402 \begin{Bmatrix} \text{Sh!t} & - & \text{Shit} \\ \text{Siht} & - & \text{Shit} \\ \text{S*it} & - & \text{Shit} \\ \text{S**t} & - & \text{Shit} \\ \text{Shi+} & - & \text{Shit} \\ & \bullet & \\ & \bullet & \\ & \bullet & \end{Bmatrix}$$

$$\begin{Bmatrix} \text{HO!SE} & - & \text{HOUSE} \\ \text{H**SE} & - & \text{HOUSE} \\ \text{HUOSE} & - & \text{HOUSE} \\ \text{HSUOE} & - & \text{HOUSE} \\ & \bullet & \\ & \bullet & \\ & \bullet & \end{Bmatrix} 404$$

FIG. 4

METHOD AND SYSTEM FOR CLASSIFYING WORD AS OBSCENE WORD

CROSS-REFERENCE

The present application claims priority to Russian Patent Application No. 2020142418, entitled "Method and System for Classifying Word as Obscene Word", filed Dec. 22, 2020, the entirety of which is incorporated herein by reference.

FIELD

The present technology generally relates to classifying a word as an obscene word and, more particularly, to a system and method for classifying a word as an obscene word in a web resource.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment-related information. Users use a variety of electronic devices (desktop, laptop, notebook, smartphone, tablets and the like) to have access to any number of web pages and rich content (like images, audio, video, animation, and other multimedia content from such networks).

Some web pages or web services allow users to exchange or post user-generated content. Although the vast majority of the users will generate content that is appropriate to all, there is always a small number of users that are less courteous and generate inappropriate content, such as content filled with offensive language (swear words, inappropriate language, etc.).

Generally speaking, there exist several computer-based approaches at identifying offensive language. For example, a simple approach is to filter user-generated content using a database of obscene word (so-called "black list" approach). However, such approach requires to build the database, which is both time and energy consuming. Moreover, an ill-intended user may circumvent such filter by intentionally misspelling the obscene word.

United States Patent Publication No. 2020/0142999 A1 entitled "Classification and Moderation of Text" published on May 7, 2020 and assigned to Valve Corporation, discloses techniques and systems for classifying and moderating text using a machine learning approach that is based on a word embedding process. For instance, word embedding vectors may be used to determine clusters of associated text (e.g., similar words) from a corpus of comments maintained by a remote computing system. The remote computing system may then identify, within the corpus of comments, a subset of comments that include text from a given cluster that was determined, from human labelling input, to include a particular type of word or speech. Using this information, the corpus of comments may be labelled with one of multiple class labels. A machine learning model(s) may be trained to classify text as one of the multiple class labels using a sampled set of labelled comments as training data. At runtime, text can be moderated based on its class label.

United States Patent Publication No. 2017/147682 A1 entitled "Automated Text-Evaluation of User Generated Text" published on May 25, 2017 and assigned to King Abdulaziz City for Science and Technology discloses a od for an automated text-evaluation service, and more particularly a method and apparatus for automatically evaluating text and returning a score which represents a degree of inappropriate language. The method is implemented in a computer infrastructure having computer executable code tangibly embodied in a computer readable storage medium having programming instructions. The programming instructions are configured to: receive an input text which comprises an unstructured message at a first computing device; process the input text according to a string-structure similarity measure which compares each word of the input text to a predefined dictionary to indicate whether there is similarity in meaning, and generate an evaluation score for each word of the input text and send the evaluation score to another computing device. The evaluation score for each input message is based on the string-structure similarity measure between each word of the input text and the predefined dictionary.

The whitepaper entitled "A Web Forum Free of Disguised Profanity by Means of Sequence Alignment" published in Ingenieria y Universidad on December 2016, discloses techniques and main engineering artefacts for filtering profanity.

The whitepaper entitled "An Abusive Text Detection System Based on Enhanced Abusive and Non-Abusive Word Lists" published in Decision Support Systems on September 2018, discloses a decision system that detects abusive text using an unsupervised learning of abusive words based on word2vec's skip-gram and the cosine similarity.

U.S. Pat. No. 9,703,872 B2 entitled "Systems and Methods for Word Offensiveness Detection and Processing Using Weighted Dictionaries and Normalization" published on Jul. 11, 2017 and assigned to IPAR LLC, discloses computer-implemented systems and methods for identifying language that would be considered obscene or otherwise offensive to a user or proprietor of a system. A plurality of offensive words are received, where each offensive word is associated with a severity score identifying the offensiveness of that word. A string of words is received. A distance between a candidate word and each offensive word in the plurality of offensive words is calculated, and a plurality of offensiveness scores for the candidate word are calculated, each offensiveness score based on the calculated distance between the candidate word and the offensive word and the severity score of the offensive word. A determination is made as to whether the candidate word is an offender word, where the candidate word is deemed to be an offender word when the highest offensiveness score in the plurality of offensiveness scores exceeds an offensiveness threshold value.

SUMMARY

It is an object of the present technology to provide improved method and systems for classifying a word as an obscene word. More specifically, the present technology aims at identifying an obscene word that is misspelled.

In developing the present technology, developers noted that it is possible to create a machine learning algorithm (MLA) to identify a misspelled word that corresponds to an obscene word, provided that it is trained on a proper training data.

Without wishing to be bound to any specific theory, embodiments of the present technology have been developed based on an assumption that by artificially creating misspells of words, these misspells can be used to train the above MLA. At least some non-limiting embodiments of the present technology are directed to generating realistic misspells based on heuristics that can be used for training the MLA.

In accordance with a first broad aspect of the present technology, there is provided a computer implemented method for classifying a word as an obscene word, the method executable by a server, the method comprising, at a training phrase: acquiring, by the server, a first word, the first word corresponding to a given obscene word; generating, by the server, a first set of misspelled words, the first set of misspelled words comprising a plurality of misspelled variations of the first word; generating, by the server, a training pairs, the training pairs comprising: a set of positive training pairs comprising the first word paired with each misspelled variations of the first word; training a machine learning algorithm (MLA) executable by the server, the training comprising: determining, for each training pairs, a set of features representative of a property of the training pairs; generating an inferred function based on the set of features, the inferred function being configured to assign, in use, an indecency score, the decency score being indicative of a likelihood of the word being obscene.

In some non-limiting embodiments of the method, the method further comprises: acquiring, by the server, a second word, the second word not corresponding to any obscene word; generating, by the server, a second set of misspelled words, the second set of misspelled words comprising a plurality of misspelled variations of the second word; and the training pairs further comprises a set of negative training pairs comprising the second word paired with each misspelled variations of the second word In some non-limiting embodiments of the method, the first set of misspelled words and the second set of misspelled words are generated by executing a misspelling algorithm.

In some non-limiting embodiments of the method, the misspelling algorithm is configured to generate the plurality of misspelled variations of the first word by at least one of: substituting a character within the first word with a typographical symbol; switching one or more characters within the first word; removing, one or more characters within the first word; substituting a second character of a first alphabet within the first word with a third character of a second alphabet, the first alphabet and the second alphabet being different alphabets.

In some non-limiting embodiments of the method, the misspelling algorithm is created using a set of heuristics.

In some non-limiting embodiments of the method, the server hosts a web resource; the method further comprising, at an in-use phase: acquiring from an electronic device, by the server, a text comprising a plurality of words to be published on the web resource; inputting, by the server, the text into the MLA, the MLA being configured to assign the decency score to each of the words included within the plurality of words; and in response to the indecency score of at least one word of the text being above a predetermined threshold, applying a restrictive action.

In some non-limiting embodiments of the method, the restrictive action is one of: removing the at least one word prior to publishing the text on the web resource; preventing the text from being published on the web resource.

In some non-limiting embodiments of the method, the web resource is associated with a social media application.

In some non-limiting embodiments of the method, the web resource is a live-chat application on a gaming platform.

In some non-limiting embodiments of the method, the MLA is a neural network.

the system comprising a server, the server comprising a processor, the processor being configured to, at a training phrase: acquire, a first word, the first word corresponding to a given obscene word; generate, a first set of misspelled words, the first set of misspelled words comprising a plurality of misspelled variations of the first word; generate, a training pairs, the training pairs comprising: a set of positive training pairs comprising the first word paired with each misspelled variations of the first word; train a machine learning algorithm (MLA) executable by the server, the training comprising: determine, for each training pairs, a set of features representative of a property of the training pairs; generate an inferred function based on the set of features, the inferred function being configured to assign, in use, an indecency score, the decency score being indicative of a likelihood of the word being obscene. In some non-limiting embodiments of the system, the processor is further configured to: acquire a second word, the second word not corresponding to any obscene word; generate a second set of misspelled words, the second set of misspelled words comprising a plurality of misspelled variations of the second word; and wherein the training pairs further comprises a set of negative training pairs comprising the second word paired with each misspelled variations of the second word.

In some non-limiting embodiments of the system, the first set of misspelled words and the second set of misspelled words are generated by executing a misspelling algorithm.

In some non-limiting embodiments of the system, the misspelling algorithm is configured to generate the plurality of misspelled variations of the first word by at least one of: substituting a character within the first word with a typographical symbol; switching one or more characters within the first word; removing, one or more characters within the first word; substituting a second character of a first alphabet within the first word with a third character of a second alphabet, the first alphabet and the second alphabet being different alphabets.

In some non-limiting embodiments of the system, the misspelling algorithm is created using a set of heuristics.

In some non-limiting embodiments of the system, the system further comprises a web resource hosted by the server; the processor being further configured to, at an in-use phase: acquire from an electronic device, a text comprising a plurality of words to be published on the web resource; input, the text into the MLA, the MLA being configured to assign the decency score to each of the words included within the plurality of words; and in response to the indecency score of at least one word of the text being above a predetermined threshold, applying a restrictive action.

In some non-limiting embodiments of the system, the restrictive action is one of: removing the at least one word prior to publishing the text on the web resource; preventing the text from being published on the web resource.

In some non-limiting embodiments of the system, the web resource is associated with a social media application.

In some non-limiting embodiments of the system, the web resource is a live-chat application on a gaming platform.

In some non-limiting embodiments of the system, the MLA is a neural network.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where:

FIG. 4 is a non-limiting embodiment of an illustration of a training dataset generated in the training phrase of FIG. 3.

DETAILED DESCRIPTION

Figure 1:
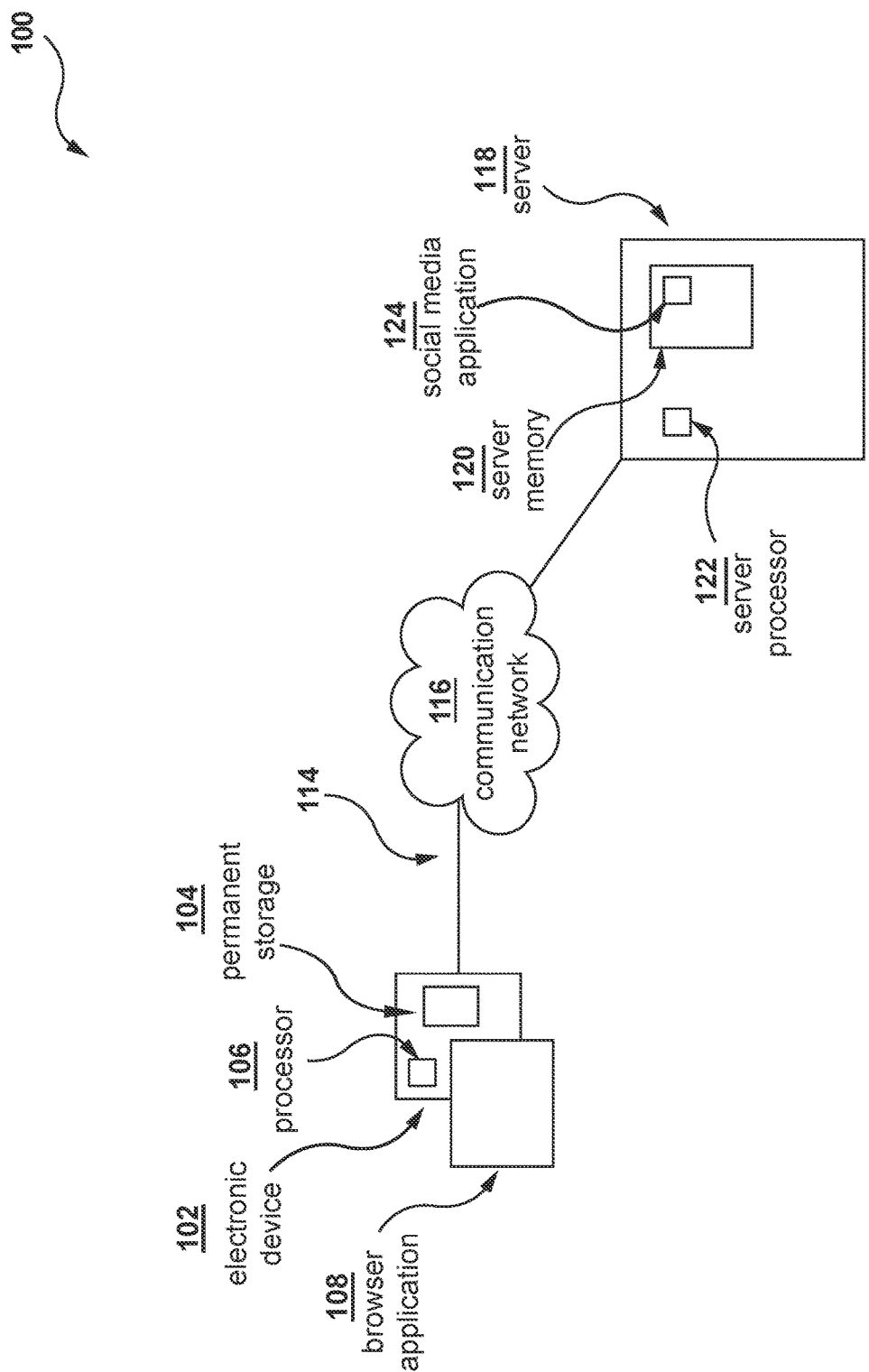
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 includes hardware and/or software and/or firmware (or a combination thereof) to execute a browser application 108. Generally speaking, the purpose of the browser application 108 is to enable the user to navigate the Internet. The manner in which the browser application 108 is implemented is known in the art and will not be described herein. Suffice it to say that the browser application 108 may be implemented as a Yandex™ browser application. It should be expressly understood that any other commercially available or proprietary browser application can be used for implementing non-limiting embodiments of the present technology.

Generally speaking, the electronic device 102 comprises a user input interface (not shown) (such as a keyboard) for receiving user inputs into, for example, a query interface (not shown). How the user input interface is implemented is not particularly limited and will depend on how the electronic device 102 is implemented. Merely as an example and not as a limitation, in those embodiments of the present technology where the electronic device 102 is implemented as a wireless communication device (such as an iPhone™ smart phone), the user input interface can be implemented as a soft keyboard (also called an on-screen keyboard or software keyboard). On the other hand, where the electronic device 102 is implemented as a personal computer, the user input interface can be implemented as a hard keyboard.

The electronic device 102 is coupled to a communication network 116 via a communication link 114. In some non-limiting embodiments of the present technology, the communication network 116 can be implemented as the Internet. In other embodiments of the present technology, the communication network 116 can be implemented differently, such as any wide-area communications network, local-area communications network, a private communications network and the like.

How the communication link 114 is implemented is not particularly limited and will depend on how the electronic device 102 is implemented. Merely as an example and not as a limitation, in those embodiments of the present technology where the electronic device 102 is implemented as a wireless communication device (such as a smart-phone), the communication link (not shown) can be implemented as a wireless communication link (such as but not limited to, a 3G communications network link, a 4G communications network link, a Wireless Fidelity, or WiFi® for short, Bluetooth® and the like). In those examples, where the electronic device 102 is implemented as a notebook computer, the communication link can be either wireless (such as the Wireless Fidelity, or WiFi® for short, Bluetooth® or the like) or wired (such as an Ethernet based connection).

It should be expressly understood that implementations for the electronic device 102, the communication link 114 and the communication network 116 are provided for illustration purposes only. As such, those skilled in the art will easily appreciate other specific implementational details for the electronic device 102, the communication link 114 and the communication network 116. As such, by no means, examples provided hereinabove are meant to limit the scope of the present technology.

The system 100 further includes a server 118 coupled to the communication network 116. The server 118 can be implemented as a conventional computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The implementation of the server 118 is well known. However, briefly speaking, the server 118 comprises a communication interface (not depicted) structured and configured to communicate with various entities (such as the electronic device 102 and other devices potentially coupled to the communication network 116) via the communication network 116.

The server 118 comprises a server memory 120 having one or more storage media which generally provides a place to store computer-executable program instructions executable by a server processor 122. By way of example, the server memory 120 may be implemented as tangible computer-readable storage medium including Read-Only Memory (ROM) and/or Random-Access Memory (RAM). The server memory 120 may also include one or more fixed storage devices in the form of, by way of example, hard disk drives (HDDs), solid-state drives (SSDs), and flash-memory cards.

In some non-limiting embodiments, the server 118 can be operated by the same entity that has provided the afore-described browser application 108. For example, if the browser application 108 is a Yandex.Navigator™ application, the server 118 can be operated by Yandex LLC of Lev Tolstoy Street, No. 16, Moscow, 119021, Russia. In alternative embodiments, the server 118 can be operated by an entity different from the one that has provided the aforementioned browser application 108.

In some non-limiting embodiments of the present technology, the server 118 is configured to store web resource, such as a social media application 124.

Figure 2:
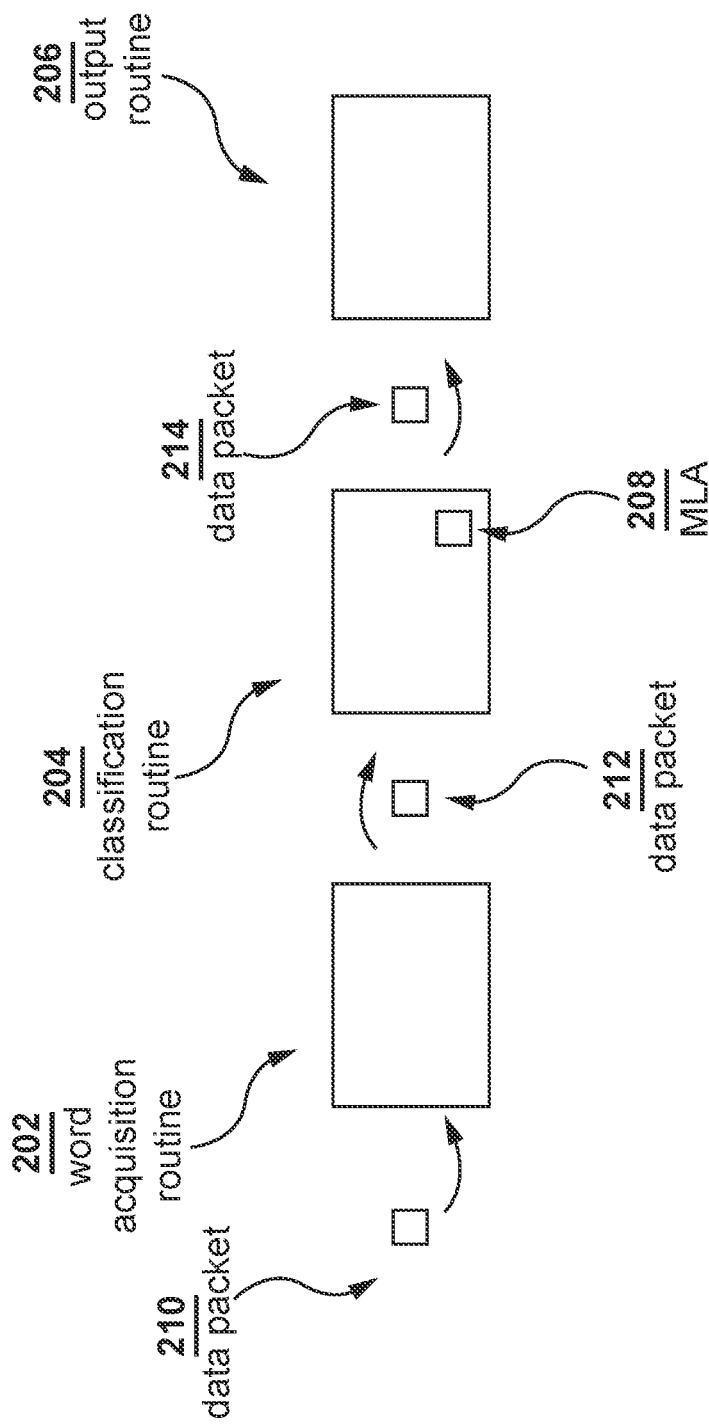
FIG. 2 is a schematic diagram of a process of the in-use phase of an application executed in the system of FIG. 1.

Functions and operations of the various components of the social media application 124 will now be described in greater details. With reference to FIG. 2, there is depicted a schematic illustration of the social media application 124 for detecting obscene words. The social media application 124 executes (or otherwise has access to): a word acquisition routine 202, a classification routine 204 and an output routine 206.

In the context of the present specification, the term "routine" refers to a subset of the computer executable program instructions of the social media application 124 that is executable by the server processor 122 to perform the functions explained below. For the avoidance of any doubt, it should be expressly understood that the word acquisition routine 202, the classification routine 204 and the output routine 206 are illustrated schematically herein in a separate and distributed manner for ease of explanation of the processes executed by the social media application 124. It is contemplated that some or all of the word acquisition routine 202, the classification routine 204 and the output routine 206 may be implemented as one or more combined routines.

For ease of understanding the present technology, functionalities of each one of the word acquisition routine 202, the classification routine 204 and the output routine 206, as well as data and/or information processed or stored therein during a pre-in-use phase of the social media application 124 are described below. An in-use phase description of the social media application 124 will follow.

Pre-In-Use Phase (Training Phase)

As it will be discussed below in more details, the social media application 124 comprises a machine learning algorithm (MLA) 208 that is part of the classification routine 204. The manner in which the MLA 208 is trained will be described below.

For understanding the underlying concepts of the present technology, it should be understood that the training of the MLA 208 can be broadly separated into a first phase and a second phase. In the first phase, training data for training the MLA 208 is generated. In the second phase, the MLA 208 is trained using the training data.

First Phase (Training)

The first phase of the training will be explained with reference to FIG. 3, where a first word 302 and a second word 304 are illustrated. The first word 302 is an obscene word. Whereas, the second word 304 is not an obscene word.

In some non-limiting embodiments of the present technology, the first word 302 and the second word 304 are received by the word acquisition routine 202 from an administrator (not shown) of the server 118. In some non-limiting embodiments of the present technology, the first word 302 and the second word 304 may be received by a database (not shown) storing a black list with set of obscene words and a white list with a set of non-obscene words.

In response to receiving the first word 302 and the second word 304, the word acquisition routine 202 is configured to generate a first set of misspelled words 306 and a second set of misspelled words 308.

The first set of misspelled words 306 comprises a plurality of misspelled variations of the first word 302, namely a first misspelled word 310, a second misspelled word 312 and a third misspelled word 314.

Needless to say, although each of the first word 302 and the second word 304 is a single word, it is not limited as such. It is contemplated that the word acquisition routine 202 receives, instead of single words, phrases for which misspelled phrases are generated.

How the first set of misspelled words 306 are generated is not limited. In some non-limiting embodiments of the present technology, the word acquisition routine 202 is configured to execute a misspelling algorithm (not illustrated) that is configured to generate the first set of misspelled words 306. More precisely, in response to receiving the first word 302, the misspelling algorithm is configured to:

substitute a character within the first word 302 with a typographical symbol;

switching one or more characters within the first word 302;

removing, one or more characters within the first word 302;

substituting a second character of a first alphabet within the first word 302 with a third character of a second alphabet, the first alphabet and the second alphabet being different alphabets (ex. replacing the Latin character "k" with the Cyrillic character "к");

creating an acronym if the first word 302 is a phrase (ex. "shut the hell up" to "sthu" and the like).

In some non-limiting embodiments of the present technology, the misspelling algorithm is created based on a set of heuristics inputted by the administrator(s) of the social media application 124.

For example, the first misspelled word 310 has substituted the third character "i", with a typographical symbol "!". The second misspelled word 312 has replaced the third character with the second character. The third misspelled word 314 has switched the second character with a typographical symbol "*".

The word acquisition routine 202 (via the misspelling algorithm) is also configured to generate a second set of misspelled words 308, which comprises a plurality of misspelled variations of the second word 304.

Figure 3:
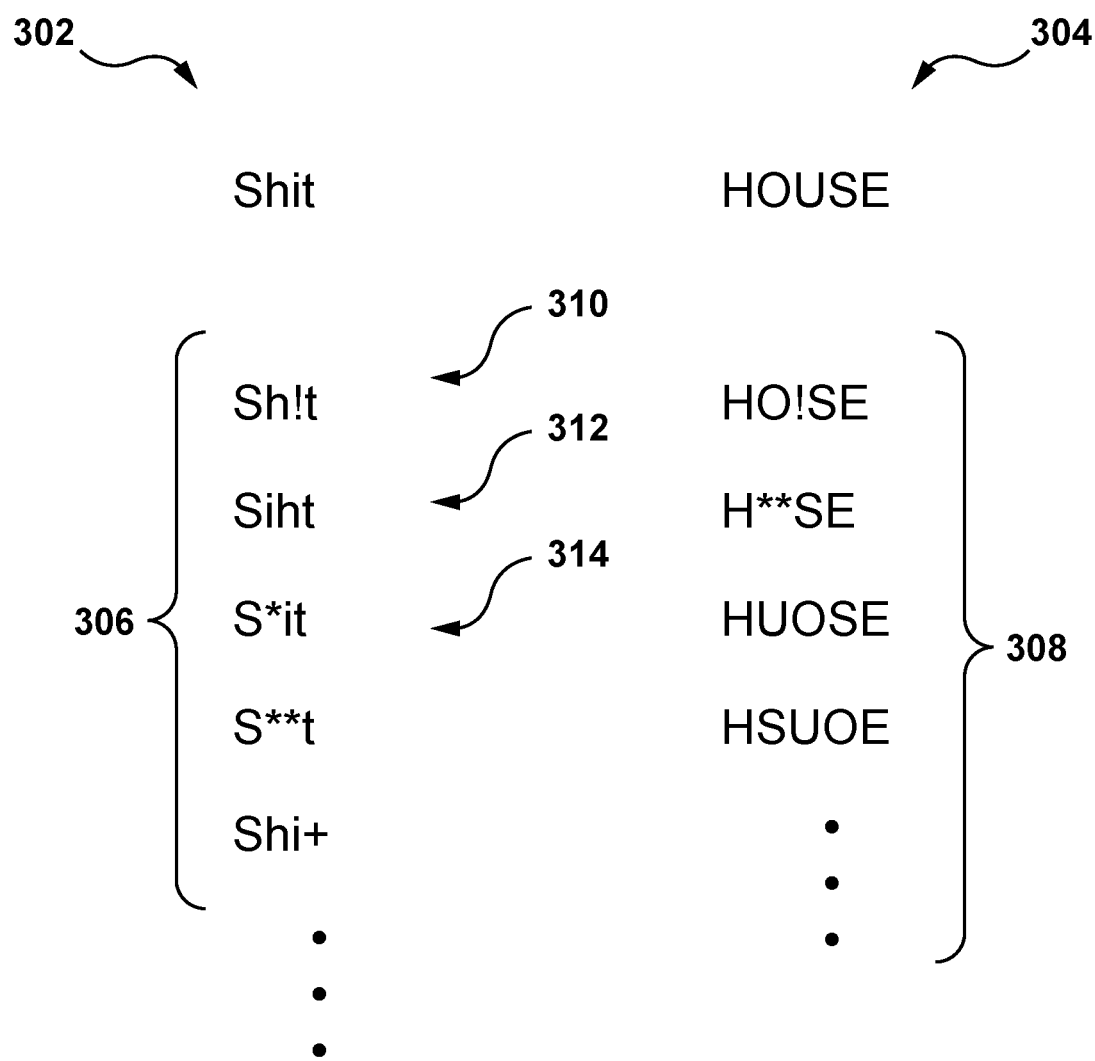
FIG. 3 is a schematic illustration of a first word and a second word used in the training phase of an MLA executed in the system of FIG. 1.

Although in FIG. 3, both the first set of misspelled words 306 and the second set of misspelled words 308 include a certain number of misspelled words it should be understood that this is done merely for ease of illustration and it should be understood that more or fewer misspelled words may be included respectively.

Referring to FIG. 4, the word acquisition routine 202 is configured to generate a set of positive training pairs 402 and a set of negative training pairs 404.

The set of positive training pairs 402 comprises the first word 302 paired with each misspelled word included within first set of misspelled words 306, namely the first misspelled word 310, the second misspelled word 312 and the third misspelled word 314.

The set of negative training pairs 404 comprises the second word 304 paired with each misspelled word included within the second set of misspelled words 308.

The set of positive training pairs 402 and the set of negative training pairs 404 form the training data for training the MLA 208. It would be apparent from the following description that each of the misspelled word (for example the first misspelled word 310, the second misspelled word 312 and the third misspelled word 314) can be considered as a training word.

The word acquisition routine 202 is further configured to assign a first label value to the set of positive training pairs 402. The first label value is indicative that each of the misspelled words included therein is a likely misspelled obscene word (i.e. a profanity that is typed to avoid conventional profanity filters and/or a mistype). By the same token, it can be said that the first label value is indicative of the first word 302 being the correctly spelled obscene word. Similarly, the word acquisition routine 202 is configured to assign a second label value to the set of negative training pairs 404. The second label value is indicative that each of the misspelled words included therein is likely a misspell of a non-obscene word.

One of the benefits of this aspect is that the automatic labelling by the word acquisition routine 202 prevents the set of training pairs (i.e. the training data) to be labelled manually, thereby saving time and/or expense since the process of labelling is a typically time consuming. In some non-limiting embodiments of the present technology, the first label value and the second label value are binary values.

Second Phase (Training)

The training of the MLA 208 will now be described. The word acquisition routine 202 is configured to transfer the training data (i.e. the set of positive training pairs 402 and the set of negative training pairs 404) to the classification routine 204, which inputs the training data into the MLA 208.

In some non-limiting embodiments of the present technology, the MLA 208 is implemented as a neural network. The MLA 208 comprises a training logic to determine a set of features for each training pair (i.e. one of the first word 302 and the second word 304 paired with a respective misspelled word).

Once the set of features for each training pair has been determined, the MLA 208 is configured to analyze the set of features between the first word 302 and its misspelled words, and the set of features between the second word 304 and its misspelled words.

More precisely, recalling that each training pair has a word that is either a misspell of an obscene word or not as indicated by the assigned label, the MLA 208 is configured to learn, what set of features are indicative of making a given word to be an obscene word. Accordingly, the MLA 208 is configured to generate an inferred function which capable of assigning a indecency score, which is indicative of a likelihood of the word being a misspell of an obscene word. How the indecency score is implemented is not limited and may for example be a percentage value.

Although the explanation of the training phase of the MLA 208 has been made using an example of only the first word 302 and the second word 304, it should be understood that the MLA 208 is trained iteratively using a plurality of both obscene and non-obscene words.

Although the training of the MLA 208 has been made using both the set of positive training pairs 404 and the set of negative training pairs 406, it is not limited as such. It is contemplated that in some non-limiting embodiments of the present technology, it is possible to train the MLA 208 using the set of positive training pairs 404 only. In other words, it is contemplated that there is no need to for the second 304 (which is a non-obscene word) or to generate the set of negative training pairs 406.

Now, having described the manner in which the MLA 208 is prepared prior to the in-use phase, attention will now be turned to the in-use phase.

In-Use Phase

Returning to FIG. 2, functionalities of each one of the word acquisition routine 202, the classification routine 204 and the output routine 206, as well as data and/or information processed or stored therein during the in-use phase of the social media application 124 are described below.

Receiving a Message

The word acquisition routine 202 is configured to receive a data packet 210. The data packet 210 is transmitted by the electronic device 102 and comprises a text to be published on the social media application 124. For example, the text may be a comment to a post, a post itself, a personal message (i.e. a "DM"), and the like.

Figure 5:
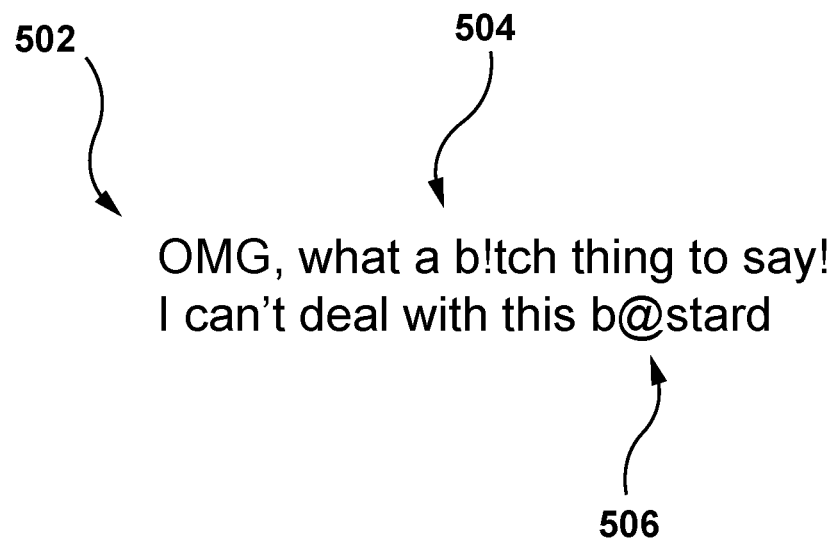
FIG. 5 is a schematic illustration of a message acquired during the in-use phase of the MLA executed in the system of FIG. 1.

With reference to FIG. 5, let us assume that the data packet 210 comprises a message 502.

The word acquisition routine 202 is then configured to parse the message 502 into individual words and transmit the individual words to the classification routine 204 via a data packet 212.

Classification

In response to receiving the data packet 212, the classification routine 204 is configured to input the individual words of the message 502 into the MLA 208.

The MLA 208 is configured to assign the indecency score to each of the individual word included within the message 502.

For example, let us assume that the MLA 208 has assigned an indecency score of 80% to a first message word 504 ("b!tch") and 90% to a second message word 506 ("b@startd").

The classification routine 204 then transmits a data packet 214 to the output routine 206. The data packet 214 comprises the indecency score for each of the word included within the message 502.

In response to receiving the data packet 214, the output routine is configured to compare the indecency scores to a threshold. How the threshold is determined is not limited and may be determined by an administrator of the social media application 124. If the indecency score is above the threshold, it is indicative that the associated word is an obscene word.

For example, let us assume that the threshold corresponds to 50%. Since the indecency score of the first message word 504 and the second message word 506 are above the threshold, the classification routine 204 is configured to classify the first message word 504 and the second message word 506 as misspells of an obscene word.

Having determined that the message 502 comprises at least one obscene word, the output routine 206 is configured to apply a restrictive action. In some non-limiting embodiments of the present technology, the restrictive action may be to remove the misspelled obscene words (i.e. the first message word 504 and the second message word 506) prior to publishing the message 502 onto the social media application 124, or preventing the message 502 to be published onto the social media application 124.

Although the above explanation has been made with reference to a social media application 124, it should be understood the present technology is not limited to social media applications. It is contemplated that the present technology be implemented in any web resources that enables a user to post or communicate, such as a live-chat application on a gaming platform, a comment section of news articles and the like.

Moreover, it should be understood that due to the context and the nature of the language itself, what may be considered to be an obscene word in a given forum may not necessarily be considered so in another forum. For example, the word "poop" may not be considered obscene on a medically related web resource. Similarly, there is no bright line that separates words as being obscene or not, as some words may be "subjectively obscene". For example, some people may feel that a so-called "minced oath", such as "darn" is an obscene word while some others won't. Although the present technology makes reference to the term "obscene word", it should be understood that this is done for ease of understanding and that it is in no way intended to be restrictive. Administrators of the social media application 124 may, subjectively, consider a word to be obscene even if it falls outside the traditional definition, and vice-versa, and train the MLA 208 accordingly.

Figure 6:
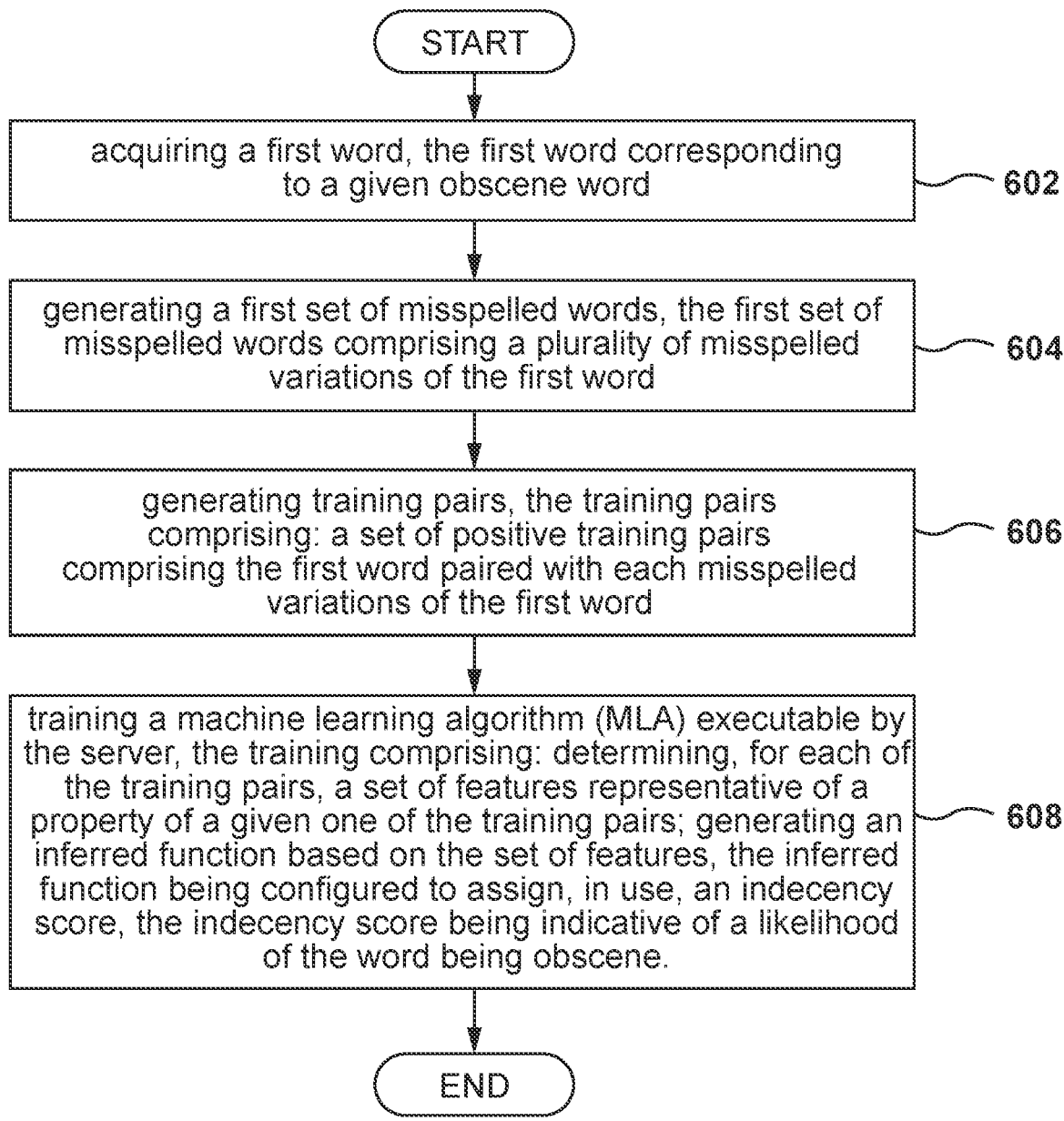
FIG. 6 depicts a block diagram of a flow chart of a method for classifying a word as an obscene word executed in the system of FIG. 1.

Given the architecture and examples provided hereinabove, it is possible to execute a computer-implemented method of classifying a word as an obscene word. With reference to FIG. 6, there is depicted a flow chart of a method 600 for training the MLA 208, the method 600 being executable in accordance with non-limiting embodiments of the present technology. The method 600 can be executed by the server 118.

Step 602: acquiring, a first word, the first word corresponding to a given obscene word The method 600 will be explained below with reference to a scenario which corresponds to the example used with reference to FIG. 3.

The method 600 starts at step 602, where the word acquisition routine 202 acquires the first word 302, which is an obscene word.

Step 604: generating, a first set of misspelled words, the first set of misspelled words comprising a plurality of misspelled variations of the first word At step 604, the word acquisition routine 202 is configured to execute the misspelling algorithm that is configured to generate the first set of misspelled words 306.

Step 606: generating training pairs, the training pairs comprising: a set of positive training pairs comprising the first word paired with each misspelled variations of the first word At step 606, the word acquisition routine 202 is configured to generate the set of positive training pairs 402.

The set of positive training pairs 402 comprises the first word 302 paired with each misspelled word included within first set of misspelled words 306, namely the first misspelled word 310, the second misspelled word 312 and the third misspelled word 314.

The set of positive training pairs 402 form the training data for training the MLA 208.

Step 608: training a machine learning algorithm (MLA) executable by the server, the training comprising: determining, for each of the training pairs, a set of features representative of a property of a given one of the training pairs; generating an inferred function based on the set of features, the inferred function being configured to assign, in use, an indecency score, the indecency score being indicative of a likelihood of the word being obscene At step 608, the word acquisition routine 202 is configured to transfer the training data to the classification routine 204, which inputs the training data into the MLA 208.

The MLA 208 comprises a training logic to determine a set of features for each training pair (i.e. the first word 302 paired with a misspelled word). In some embodiments, the set of features are representative of the properties of the given training pair.

Once the set of features for each training pair has been determined, the MLA 208 is configured to analyze the set of features between the first word 302 and its misspelled words.

More precisely, recalling that each training pair has a word that is either a misspell of an obscene word or not as indicated by the assigned label, the MLA 208 is configured to learn, what set of features are indicative of making a given word to be an obscene word. Accordingly, the MLA 208 is configured to generate an inferred function which is capable of assigning an indecency score, which is indicative of a likelihood of the word being a misspell of an obscene word. How the indecency score is implemented is not limited and may for example be a percentage value.

It should be apparent to those skilled in the art that at least some embodiments of the present technology aim to expand a range of technical solutions for addressing a particular technical problem, namely classifying a word as being obscene, thus improving energy consumption and memory allocation.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer implemented method for classifying a word as an obscene word, the method being executable by one or more servers, the method comprising, at a training phase:
   acquiring a first word, the first word corresponding to a given obscene word;
   generating a first set of misspelled words, the first set of misspelled words comprising a plurality of misspelled variations of the first word;
   generating training pairs, the training pairs comprising:
      a set of positive training pairs comprising the first word paired with each misspelled variations of the first word;
   training a machine learning algorithm (MLA), the training comprising:
      determining, for each of the training pairs, a set of features representative of a property of a given one of the training pairs; and
      generating an inferred function based on the set of features, the inferred function being configured to assign, in use, an indecency score, the indecency score being indicative of a likelihood of the word being obscene.

2. The method of claim 1, wherein the method further comprises:
acquiring a second word, the second word not corresponding to any obscene word;
generating a second set of misspelled words, the second set of misspelled words comprising a plurality of misspelled variations of the second word; and
wherein the training pairs further comprise a set of negative training pairs comprising the second word paired with each misspelled variations of the second word.

3. The method of claim 2, wherein the first set of misspelled words and the second set of misspelled words are generated by executing a misspelling algorithm.

4. The method of claim 3, wherein the misspelling algorithm is configured to generate the plurality of misspelled variations of the first word by at least one of:
substituting a given character within the first word with a typographical symbol;
switching one or more characters within the first word;
removing, one or more characters within the first word;
substituting the given character of a first alphabet within the first word with a corresponding character of a second alphabet, the first alphabet and the second alphabet being different alphabets.

5. The method of claim 4, wherein the misspelling algorithm is created using a set of heuristics.

6. The method of claim 1,
further comprising, at an in-use phase:
acquiring, from an electronic device, a text comprising a plurality of words to be published on a web resource;
inputting the text into the MLA, the MLA being configured to assign the decency indecency score to each of the words included within the plurality of words; and
in response to the indecency score of at least one word of the text being above a predetermined threshold, applying a restrictive action.

7. The method of claim 6, wherein the restrictive action is one of:
removing the at least one word prior to publishing the text on the web resource;
preventing the text from being published on the web resource.

8. The method of claim 6, wherein the web resource is associated with a social media application.

9. The method of claim 6, wherein the web resource is a live-chat application on a gaming platform.

10. The method of claim 1, wherein the MLA is a neural network.

11. A system for classifying a word as an obscene word, the system comprising a server, the server comprising at least one processor and at least one non-transitory computer-readable memory storing instructions, which, when executed by the at least one processor, at a training phase, cause the system to:
acquire, a first word, the first word corresponding to a given obscene word;
generate, a first set of misspelled words, the first set of misspelled words comprising a plurality of misspelled variations of the first word;
generate training pairs, the training pairs comprising:
a set of positive training pairs comprising the first word paired with each misspelled variations of the first word;
train a machine learning algorithm (MLA) executable by the server, the training comprising:
determine, for each of the training pairs, a set of features representative of a property of a given one of the training pairs; and
generate an inferred function based on the set of features, the inferred function being configured to assign, in use, an indecency score, the indecency score being indicative of a likelihood of the word being obscene.

12. The system of claim 11, wherein the at least one processor further causes the system to:
acquire a second word, the second word not corresponding to any obscene word;
generate a second set of misspelled words, the second set of misspelled words comprising a plurality of misspelled variations of the second word; and
wherein the training pairs further comprise a set of negative training pairs comprising the second word paired with each misspelled variations of the second word.

13. The system of claim 12, wherein the first set of misspelled words and the second set of misspelled words are generated by executing a misspelling algorithm.

14. The system of claim 13, wherein the misspelling algorithm is configured to generate the plurality of misspelled variations of the first word by at least one of:
substituting a given character within the first word with a typographical symbol;
switching one or more characters within the first word;
removing, one or more characters within the first word;
substituting the given character of a first alphabet within the first word with a corresponding character of a second alphabet, the first alphabet and the second alphabet being different alphabets.

15. The system of claim 14, wherein the misspelling algorithm is trained using a set of heuristics.

16. The system of claim 11, wherein the system further comprises a web resource hosted by the server; and wherein the at least one processor, at an in-use phase, further causes the system to:
acquire from an electronic device, a text comprising a plurality of words to be published on the web resource;
input, the text into the MLA, the MLA being configured to assign the indecency score to each of the words included within the plurality of words; and
in response to the indecency score of at least one word of the text being above a predetermined threshold, applying a restrictive action.

17. The system of claim 16, wherein the restrictive action is one of:
removing the at least one word prior to publishing the text on the web resource;
preventing the text from being published on the web resource.

18. The system of claim 16, wherein the web resource is associated with a social media application.

19. The system of claim 16, wherein the web resource is a live-chat application on a gaming platform.

20. The system of claim 11, wherein the MLA is a neural network.

* * * * *